(12) United States Patent
Merlin et al.

(10) Patent No.: US 9,730,218 B2
(45) Date of Patent: Aug. 8, 2017

(54) SYSTEMS AND METHODS FOR GROUP ACCESS TO THE WIRELESS MEDIUM OF A WIRELESS NETWORK

(71) Applicant: QUALCOMM Incorporated, San Diego, CA (US)

(72) Inventors: Simone Merlin, Solana Beach, CA (US); Hemanth Sampath, San Diego, CA (US); Gwendolyn Denise Barriac, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 244 days.

(21) Appl. No.: 14/526,401

(22) Filed: Oct. 28, 2014

(65) Prior Publication Data
US 2015/0124785 A1    May 7, 2015

Related U.S. Application Data

(60) Provisional application No. 61/898,775, filed on Nov. 1, 2013.

(51) Int. Cl.
*H04W 72/04*    (2009.01)
*H04L 12/823*   (2013.01)
(Continued)

(52) U.S. Cl.
CPC ......... *H04W 72/0446* (2013.01); *H04L 47/32* (2013.01); *H04W 74/002* (2013.01); *H04W 74/08* (2013.01); *H04L 12/413* (2013.01)

(58) Field of Classification Search
CPC ..... H04L 1/188; H04L 1/1887; H04L 12/413; H04L 12/40143; H04L 47/10; H04L 47/14; H04L 47/24; H04L 47/32; H04L 47/245; H04L 47/283; H04L 47/2416; H04L 47/2433; H04L 47/6275; H04W 28/0252; H04W 56/00; H04W 72/04; H04W 72/12;
(Continued)

(56) References Cited

U.S. PATENT DOCUMENTS 8,638,772 B2    1/2014  Seok
2002/0154653 A1  10/2002  Benveniste
(Continued)

OTHER PUBLICATIONS

International Search Report and Written Opinion—PCT/US2014/062891—ISA/EPO—Feb. 4, 2015.

*Primary Examiner* — Alpus H Hsu
*Assistant Examiner* — Dharmesh Patel
(74) *Attorney, Agent, or Firm* — Knobbe, Martens, Olson & Bear LLP

(57) ABSTRACT

Systems and methods for allowing group access to the wireless medium of a wireless network are disclosed. In one aspect, the method includes performing a backoff procedure for each of one or more certain classes. The method may further include receiving an indication that the backoff procedure for at least one of the one or more certain classes is complete. In some aspects, once the backoff procedure for a class is completed, performing one or more transmissions which are transmittable simultaneously with other transmissions in the class. Finally, the method may update the backoff procedures for the class based on the one or more transmissions. In some aspects, the backoff procedures may be updated based on certain fairness conditions.

33 Claims, 11 Drawing Sheets

(51) Int. Cl.
*H04W 74/00* (2009.01)
*H04L 12/413* (2006.01)
*H04W 74/08* (2009.01)

(58) Field of Classification Search
CPC ......... H04W 72/0413; H04W 72/1231; H04W 72/1242; H04W 74/02; H04W 74/04; H04W 74/085; H04W 84/10; H04W 84/12; H04W 8/005; H04W 16/14; H04W 24/00; H04W 24/08; H04W 28/10; H04W 28/048; H04W 36/08; H04W 36/22; H04W 36/30; H04W 48/08; H04W 48/16; H04W 48/20; H04W 52/16; H04W 52/18; H04W 52/24; H04W 52/34; H04W 52/36; H04W 52/283; H04W 52/322; H04W 52/346; H04W 72/08; H04B 17/30; G08B 21/0247; G08B 21/0275; G06K 7/0008; G06K 7/10079; H04N 21/4126
See application file for complete search history.

(56) References Cited

U.S. PATENT DOCUMENTS

| | | | |
|---|---|---|---|
| 2005/0141547 A1* | 6/2005 | Cho | H04W 74/0875 370/448 |
| 2007/0041398 A1* | 2/2007 | Benveniste | H04L 47/10 370/448 |
| 2009/0109904 A1* | 4/2009 | Gaur | H04W 74/0866 370/329 |
| 2011/0255618 A1 | 10/2011 | Zhu et al. | |
| 2012/0008490 A1 | 1/2012 | Zhu | |
| 2012/0163265 A1 | 6/2012 | Kotecha et al. | |
| 2012/0207074 A1 | 8/2012 | Kneckt | |
| 2012/0230205 A1* | 9/2012 | An | H04W 28/044 370/242 |
| 2012/0275305 A1 | 11/2012 | Lin | |
| 2014/0079046 A1 | 3/2014 | Yang et al. | |

* cited by examiner

SYSTEMS AND METHODS FOR GROUP ACCESS TO THE WIRELESS MEDIUM OF A WIRELESS NETWORK

CLAIM OF PRIORITY UNDER 35 U.S.C. §119

The present application for patent claims priority to Provisional Application No. 61/898,775 entitled "SYSTEMS AND METHODS FOR GROUP ACCESS TO THE WIRELESS MEDIUM OF A WIRELESS NETWORK" filed Nov. 1, 2013, and assigned to the assignee hereof and hereby expressly incorporated by reference herein.

FIELD

The present application relates generally to wireless communications, and more specifically to systems, methods, and devices for group access to the wireless medium of a wireless network.

BACKGROUND

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network can transmit and/or receive information to and from each other. The information can include packets, which in some aspects can be referred to as data units. The packets can include overhead information (e.g., header information, packet properties, etc.) that helps in routing the packets through the network, identifying the data in the packets, processing the packets, etc. The packets can further include data, such as user data, multimedia content, etc. that can be carried in a payload of the packet. Prior to sending a packet, a wireless device may first determine if the wireless medium is in use. If the medium is in use, the wireless device may defer sending a packet. However, in some cases it may be possible for two or more devices to transmit on the wireless medium simultaneously without disrupting each other's transmissions. Accordingly, more efficient systems and methods for timing various communications on a wireless medium are desired.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of the present disclosure provides a method for a device to perform a common medium access procedure for the transmission of packets of one or more certain classes. The method includes performing a backoff procedure for each of the one or more certain classes, wherein transmissions in a class of the one or more certain classes are transmittable simultaneously with other transmissions in the class, receiving an indication from at least one other device that the backoff procedure for that class has been completed at the at least one other device receive an indication that the backoff procedure for at least one of the one or more certain classes is complete, once the backoff procedure for a class is completed, performing one or more transmissions which are transmittable simultaneously with other transmissions in the class which are transmitted by one or more other devices, and updating the backoff procedures for the class based on the one or more transmissions.

In some aspects, the present disclosure provides a device for performing a common medium access procedure for the transmission of packets of one or more certain classes. The device includes a processor configured to perform a backoff procedure for each of the one or more certain classes, wherein transmissions in a class of the one or more certain classes are transmittable simultaneously with other transmissions in the class, receiving an indication from at least one other device that the backoff procedure for that class has been completed at the at least one other device receive an indication that the backoff procedure for at least one of the one or more certain classes is complete, perform one or more transmissions, once the backoff procedure for a class is completed, which are transmittable simultaneously with other transmissions in the class which are transmitted by one or more other devices, and update the backoff procedures for the class based on the one or more transmissions.

In one aspect, a device for performing a common medium access procedure for the transmission of packets of one or more certain classes is described. The device includes means for performing a backoff procedure for each of the one or more certain classes, wherein transmissions in a class of the one or more certain classes are transmittable simultaneously with other transmissions in the class, means for receiving an indication from at least one other device that the backoff procedure for that class has been completed at the at least one other device receive an indication that the backoff procedure for at least one of the one or more certain classes is complete, means for performing one or more transmissions, once the backoff procedure for a class is completed, which are transmittable simultaneously with other transmissions in the class which are transmitted by one or more other devices, and means for updating the backoff procedures for the class based on the one or more transmissions.

In one aspect, the present disclosure describes a non-transitory physical computer storage comprising computer executable instructions configured to implement a method for performing a common medium access procedure for the transmission of packets of one or more certain classes. The method includes performing a backoff procedure for each of the one or more certain classes, wherein transmissions in a class of the one or more certain classes are transmittable simultaneously with other transmissions in the class, receiving an indication from at least one other device that the backoff procedure for that class has been completed at the at least one other device receive an indication that the backoff procedure for at least one of the one or more certain classes is complete, performing one or more transmissions, once the backoff procedure for a class is completed, which are transmittable simultaneously with other transmissions in the class which are transmitted by one or more other devices, and updating the backoff procedures for the class based on the one or more transmissions.

In one aspect, a method for a device to perform a common medium access procedure for the transmission of packets of one or more certain classes by a plurality of devices is described. The method includes initiating a counter for a class of the one or more certain classes, wherein transmissions in a class of the one or more certain classes are transmittable simultaneously with other transmissions in the class, decrementing the counter based upon a clear channel assessment at two or more of the plurality of devices, once the backoff procedure for the class is completed, sending instructions to two or more of the plurality of devices which instruct those devices to perform one or more transmissions which are transmittable simultaneously with other transmissions in the class which are transmitted by one or more other devices, and updating the backoff procedures for the class based on the one or more transmissions.

In one aspect, a device for performing a common medium access procedure for the transmission of packets of one or more certain classes by a plurality of devices is described. The device includes a processor configured to initiate a counter for a class of the one or more certain classes, wherein transmissions in a class of the one or more certain classes are transmittable simultaneously with other transmissions in the class, decrement the counter based upon a clear channel assessment at two or more of the plurality of devices, send instructions, once the backoff procedure for the class is completed, to two or more of the plurality of devices which instruct those devices to perform one or more transmissions which are transmittable simultaneously with other transmissions in the class which are transmitted by one or more other devices, and update the backoff procedures for the class based on the one or more transmissions.

In one aspect, a device for method for a device to perform a common medium access procedure for the transmission of packets of one or more certain classes by a plurality of devices is described. The device includes means for initiating a counter for a class of the one or more certain classes, wherein transmissions in a class of the one or more certain classes are transmittable simultaneously with other transmissions in the class, means for decrementing the counter based upon a clear channel assessment at two or more of the plurality of devices, means for sending instructions, once the backoff procedure for the class is completed, to two or more of the plurality of devices which instruct those devices to perform one or more transmissions which are transmittable simultaneously with other transmissions in the class which are transmitted by one or more other devices, and means for updating the backoff procedures for the class based on the one or more transmissions.

In one aspect, a non-transitory physical computer storage comprising computer executable instructions configured to implement a method for a device to perform a common medium access procedure for the transmission of packets of one or more certain classes by a plurality of devices is described. The method includes initiating a counter for a class of the one or more certain classes, wherein transmissions in a class of the one or more certain classes are transmittable simultaneously with other transmissions in the class, decrementing the counter based upon a clear channel assessment at two or more of the plurality of devices, once the backoff procedure for the class is completed, sending instructions to two or more of the plurality of devices which instruct those devices to perform one or more transmissions which are transmittable simultaneously with other transmissions in the class which are transmitted by one or more other devices, and updating the backoff procedures for the class based on the one or more transmissions.

DETAILED DESCRIPTION

Figure 1:
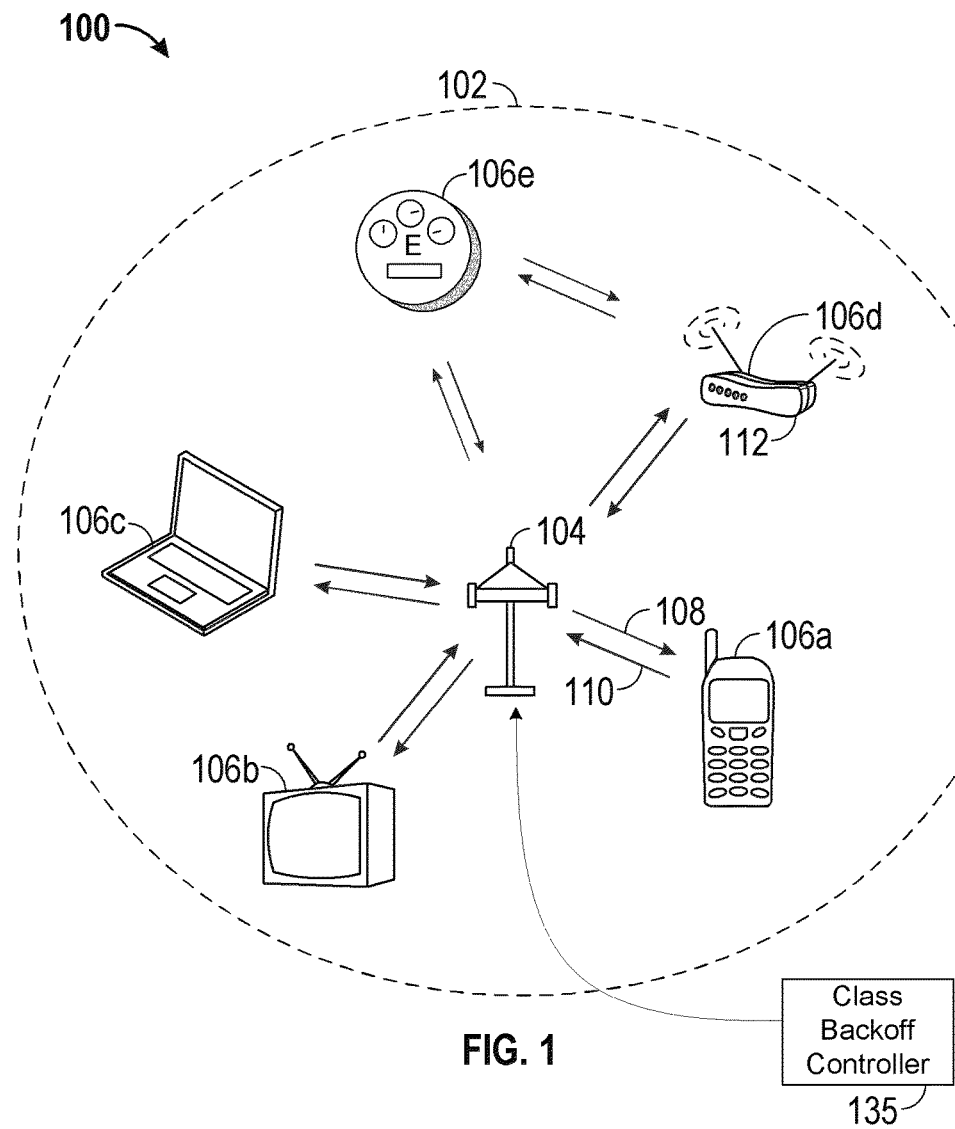
FIG. 1 illustrates an example of a wireless communication system in which aspects of the present disclosure can be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes.

Certain devices, of the devices described herein, may further implement Multiple Input Multiple Output (MIMO) technology and be implemented as part of an 802.11 protocol. A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels or streams. Each of the NS independent channels corresponds to a dimension. The MIMO system can provide improved performance (e.g., higher throughput and/or greater reliability) if the additional dimensionalities created by the multiple transmit and receive antennas are utilized.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, a STA may be a laptop computer, a personal digital assistant (PDA), a mobile phone, etc. In an example, an STA connects to an AP via a WiFi (e.g., IEEE 802.11 protocol) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure may be employed. The wireless communication system 100 may operate pursuant to a wireless standard, for example the 802.11 standard. The wireless communication system 100 may include an AP 104, which communicates with STAs 106a, 106b, 106c, 106d, and 106e (collectively STAs 106).

STA 106e may have difficulty communicating with the AP 104 or may be out of range and unable to communicate with the AP 104. As such, another STA 106d may be configured as a relay 112 that relays communications between the STA 106e and the AP 104.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106. In some aspects, each wireless device 202 in the wireless network may be in communications with a class backoff controller 135. In some aspects, the class backoff controller 135 may be a separate unit from the wireless device 202, or may be integrated into the wireless device 202 itself. The class backoff controller 135 may be configured to implement a class-based backoff procedure, in order to allow more efficient reuse of the wireless medium. For example, the class backoff controller 135 may be configured to increase the reuse of the wireless medium, by allowing two or more devices to transmit simultaneously on the wireless medium, provided that the two or more devices are in a compatible class with each other, such that their transmissions will not interfere with each other. The use of such a class backoff controller 135 is described below in further detail, with reference to FIGS. 4-7.

Figure 2:
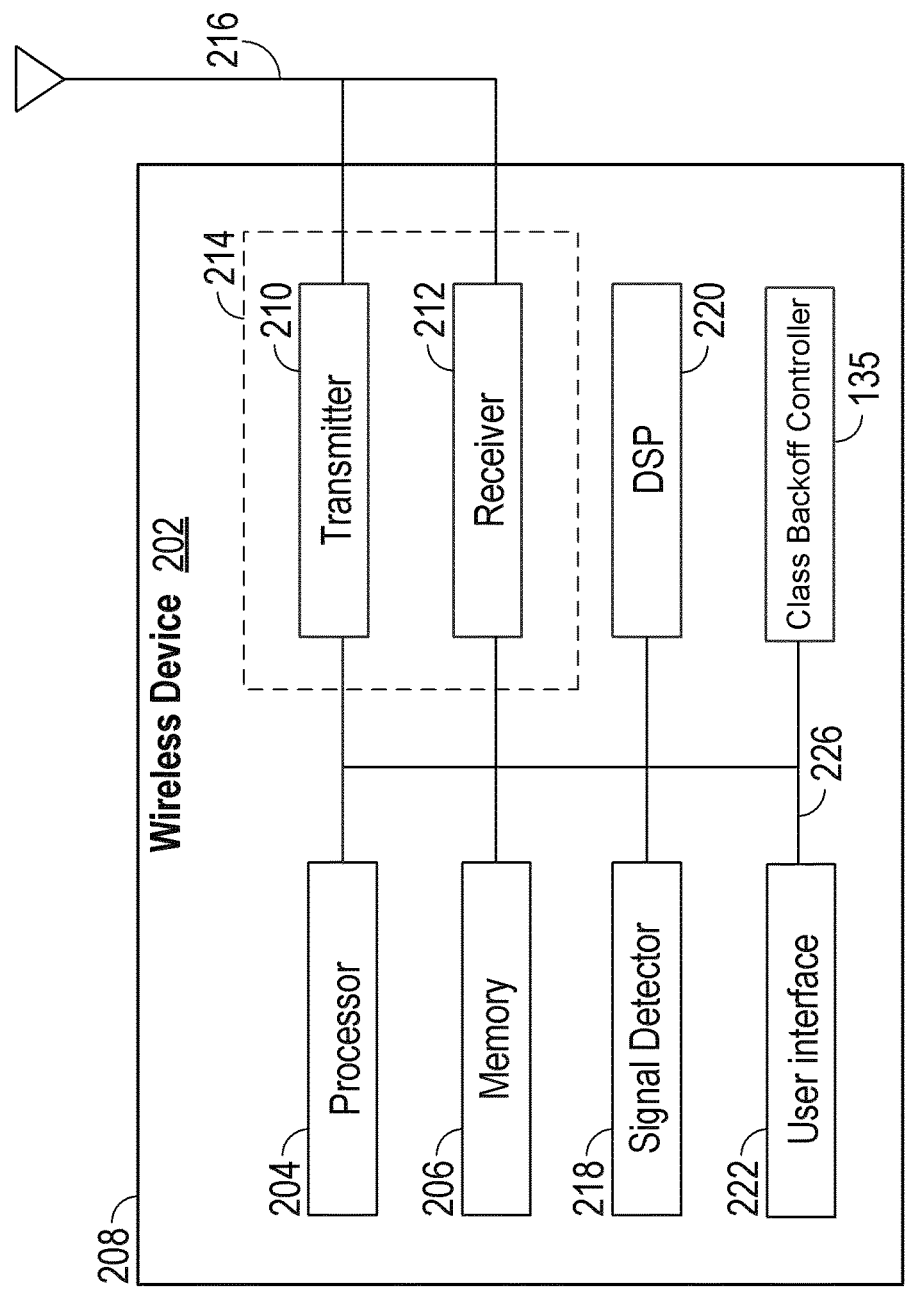
FIG. 2 shows a functional block diagram of a wireless device that can be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104, a relay 112, or one of the STAs 106 of FIG. 1.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

When the wireless device 202 is implemented or used as a transmitting node, the processor 204 may be configured to select one of a plurality of media access control (MAC) header types, and to generate a packet having that MAC header type. For example, the processor 204 may be configured to generate a packet comprising a MAC header and a payload and to determine what type of MAC header to use.

When the wireless device 202 is implemented or used as a receiving node, the processor 204 may be configured to process packets of a plurality of different MAC header types. For example, the processor 204 may be configured to determine the type of MAC header used in a packet and process the packet and/or fields of the MAC header.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The transmitter 210 may be configured to wirelessly transmit packets having different MAC header types. For example, the transmitter 210 may be configured to transmit packets with different types of headers generated by the processor 204, discussed above.

The receiver 212 may be configured to wirelessly receive packets having different MAC header type. In some aspects, the receiver 212 is configured to detect a type of a MAC header used and process the packet accordingly.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism. In some aspects, the wireless device 202 may include a class backoff controller 135.

Although a number of separate components are illustrated in FIG. 2, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements. Furthermore, the processor 204 may be used to implement any of the components, modules, circuits, or the like described below, or each may be implemented using a plurality of separate elements.

For ease of reference, when the wireless device 202 is configured as a transmitting node, it is hereinafter referred to as a wireless device 202t. Similarly, when the wireless device 202 is configured as a receiving node, it is hereinafter referred to as a wireless device 202r. A device in the wireless communication system 100 may implement only functionality of a transmitting node, only functionality of a receiving node, or functionality of both a transmitting node and a receive node.

As discussed above, the wireless device 202 may comprise an AP 104 or a STA 106. Such a wireless device 202 may be configured to transmit on a wireless medium, such as at a particular frequency.

Prior to transmitting on the wireless medium, a wireless device 202 may determine whether the wireless medium is currently in use by another device. For example, this determination may include a clear channel assessment (CCA), such as CCA carrier sense (CCA-CS) and/or CCA energy detect (CCA-ED). These assessments may include measuring the energy of the transmissions on the wireless medium, such as at a particular frequency, or attempting to locate a known packet preamble, such as an 802.11 packet preamble. The wireless device 202 may be configured to defer communications on the wireless medium if the wireless medium contains transmissions from other devices, such as if an energy level on the wireless medium is above a threshold, or if a packet preamble is detected.

In some cases, two or more devices may wish to transmit on the same wireless medium or channel at the same time. These wireless devices 202 may be a part of the same network, or may be a part of two or more different wireless networks that share a wireless medium. For example, two or more wireless devices 202 may include two different STAs 106, each of which wish to communicate with a different AP 104 which the STAs 106 are associated with. These APs 104 may be in the same geographic region or area as each other and may share a wireless medium (e.g., operate in overlapping portions of a spectrum with each other), and may be on either the same wireless network or different wireless networks. If these STAs 106 share the same wireless medium, in some cases, one of these devices may observe that the other is transmitting on the medium and may thus defer to the other device for at least the duration of the transmission. Accordingly, the devices may be configured such that only one device at a time may use the wireless medium. In some aspects, if it would be possible for two or more devices to transmit simultaneously on the wireless medium without interfering with each other, it may be preferable to allow such simultaneous transmissions. Allowing such simultaneous transmissions may promote more efficient use of the wireless medium.

The continuous interval of time during which a STA is allowed to transmit packets with certain properties, after gaining or being granted access to the medium, may be referred to as a Transmit Opportunity (TXOP). A STA 106 may gain a TXOP by completing a backoff procedure, checking if the wireless medium is clear, and then transmitting a packet with the certain properties on the medium. The AP 104 may grant this access, for example, by sending a message to all devices in the area that the channel is reserved for some period of time, during which the AP 104 or the STA 106 may transmit on the channel. During this TXOP, the STA 106 may send as many frames as possible for the duration of the TXOP. During this TXOP, other devices that are aware of the TXOP will defer to the STA 106. However, a class of compatible TXOPs may be defined as the class of all TXOPs with packets that satisfy certain common properties. In particular, a class of compatible TXOPs may be the class of all transmissions that can happen simultaneously without disrupting the reception of any of the transmissions. For example, in certain topologies, a TXOP class may include all TXOPs that are uplink traffic only or downlink traffic only. In other network topologies, a TXOP class may also include all TXOPs where only a certain set of STAs 106 is either the transmitter or the receiver. For example, the set of STAs 106 may be based on which STAs belong to a certain sector, or which STAs 106 support at least a certain MCS (Modulation and Coding Scheme). For example, the set of STAs 106 may be based on which STAs belong to a certain AP (BSSID). Each class may also be identified by, for example, a numeric identifier.

Based on these classes, it may be possible to achieve more efficient use of the wireless medium by allowing multiple TXOPs of the same class to use the wireless medium simultaneously. Accordingly, in order to enable efficient use of the wireless medium, certain systems and methods may be defined which may allow compatible TXOPs to gain access to the wireless medium at the same time, in order to improve reuse of the medium.

Figure 3:
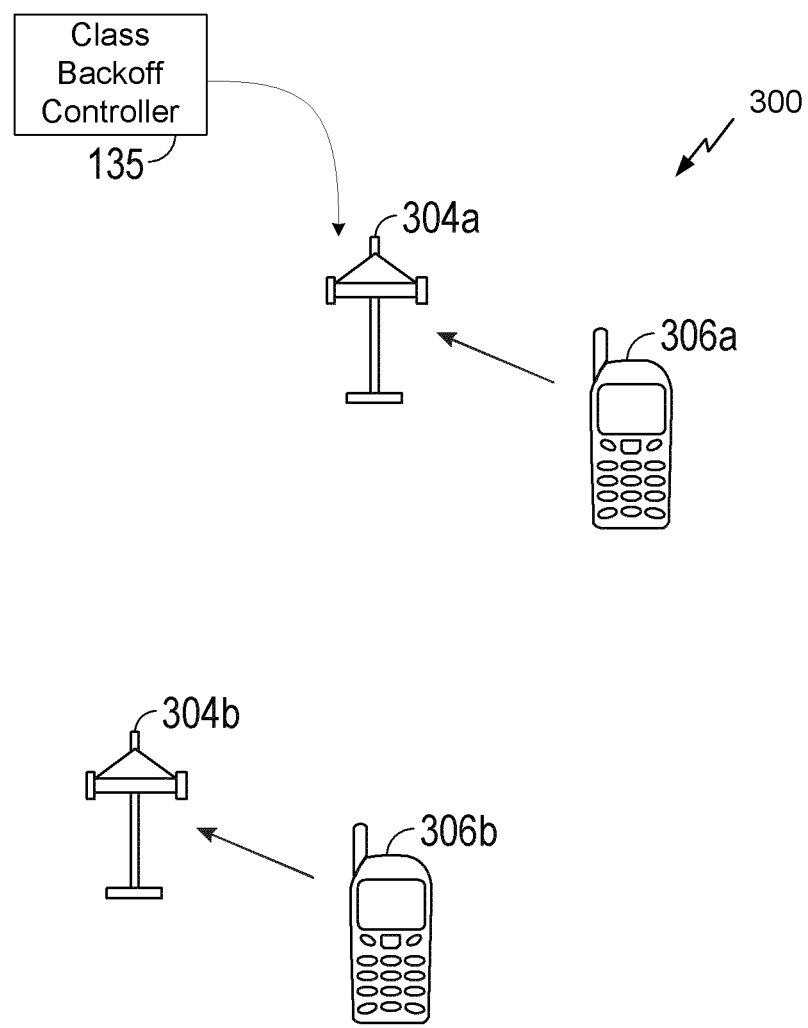
FIG. 3 illustrates two access points which may be in the some compatible Transmit Opportunity (TXOP) class as each other.

FIG. 3 is a diagram 300 of two devices which, for at least some of their transmissions, may be in the same class of compatible TXOPs. In this diagram 300, STA 306a is in communication with AP 304a. Similarly, STA 306b is in communication with AP 304b. Some communications from STA 306a may be in a class of compatible TXOPs with similar communications from STA 306b. For example, certain TXOPs between STA 306a and AP 304a may not interfere with certain TXOPs between STA 306b and AP 304b, and vice versa. In some aspects, some or all of the communications between STA 306a and AP 304a may be in a class of compatible TXOPs with similar communications between STA 306b and AP 304b. A number of reasons may lead to these communications being in a class of compatible TXOPs. For example, as in FIG. 3, STA 306a may be much closer to AP 304a than it is to either STA 306b or AP 304b. Similarly, STA 306b may be much closer to AP 304b than it is to either STA 306a or AP 304a. Thus, each AP 304a, 304b may be able to receive certain transmissions from the nearby STA 306a, 306b with much greater signal strength than those from the more distant STA 306a, 306b. Thus, in some aspects, these transmissions may be in a class of compatible TXOPs, for STA 306a and STA 306b.

It may be beneficial to align compatible TXOPs classes with each other, such that the wireless medium may be reused. By allowing such reuse of the wireless medium, more communications may be transmitted on the wireless medium in a shorter period of time, allowing the wireless medium to support more devices in a given area than without such medium reuse. In some aspects, it may be beneficial to align classes of compatible TXOPs communications, such as uplink (or downlink) packets from two or more compatible TXOPs, such that communications begin at the same time. However, such uplink or downlink alignment may not be possible in certain deployments, including unlicensed, badly-planned deployments, as such deployments may contain a number of hidden overlapping operators. Such hidden overlapping operators may lead to interference between two or more devices transmitting at the same time, when the devices are not in classes of compatible TXOPs, due to the presence, for example, of hidden nodes. Similarly, such alignment may not be possible in certain deployments, in which each wireless device 202 across multiple networks is not synchronized with each other.

However, it may not be necessary to actively synchronize each wireless device 202 across different wireless networks (such as by transmitting synchronization messages between the devices) in order to allow reuse of the medium and to enable classes of compatible TXOPs to be transmitted at the same time, although some level of synchronization may be needed. Instead, a class backoff procedure may be used, whereby each member of a given TXOP class may use the same backoff procedure for the wireless medium. These backoff procedures may be centralized on a single device, or may be decentralized across multiple devices. Typically, when a wireless device determines that a wireless medium is in use, the wireless device will begin a backoff counter, and will count down for a certain period of time prior to attempting again to access the wireless medium. In some aspect, this backoff counter may be set to a random or pseudo-random value, within certain parameters. For example, the backoff counter may count down from a random value to zero, counting down only at times when the medium is idle. In some aspects, when the backoff counter reaches zero, the wireless device may be allowed to access the wireless medium. However, it may be useful to define a TXOP class backoff. Multiple backoff procedures, one per each class of compatible TXOPs, may be performed concurrently. Such a backoff procedure for a class of compatible TXOPs may allow multiple compatible TXOP transmissions to appear at the same time. Performing multiple backoff procedures, one per each class of compatible TXOPs, may allow for competition among TXOPs which have different properties in terms of medium reuse they can sustain. In some aspects, the TXOP class backoff procedure used may be used by a number of APs 104 which share a wireless medium or channel, and are in a geographic region where their communications may interfere with one another. In some aspects, the TXOP class backoff procedure may include that, when an APs 104 allows access to the wireless medium to a certain TXOP class, other nearby APs 104 may be alerted of this, such that those APs 104 may, for example, also allow access to the wireless medium to that class, if the medium is idle. Accordingly, the use of such a group backoff procedure may allow multiple members of a given group or class to access the wireless medium simultaneously, without requiring that those different members of the group or class synchronize with each other directly.

By using a group backoff for classes of compatible TXOPs, concurrent access to the wireless medium by compatible TXOPs may be allowed and may be favored. Depending on the implementation of such a TXOP class backoff procedure, it may occur that certain TXOP classes are granted access to the wireless medium more frequently than other TXOP class. This may not be desirable, and may be seen as unfair, especially to legacy devices which might not support such concurrent transmissions. However, this risk of unfairness may be minimized by the use of certain TXOP class backoff procedures, as described below. Thus, one possible goal of such an approach is to allow and maximize the number of concurrent transmissions, without using a predefined schedule or requiring that wireless devices 202 across multiple wireless networks maintain synchronized clocks with each other. In some aspects, an AP, such as AP 304a, may include a class backoff counter 135. In some aspects, each wireless device 202 in one or more networks may include a class backoff procedure. For example, each STA 106 and each AP 104 may include a class backoff procedure. In some aspects, each of these devices may use a common backoff procedure for each different class of compatible TXOPs. That is, each device may use the same backoff procedure for a given class of compatible TXOPs. The use of such a class backoff counter 135 may allow for more efficient use of the wireless medium, as described below.

Figure 4:
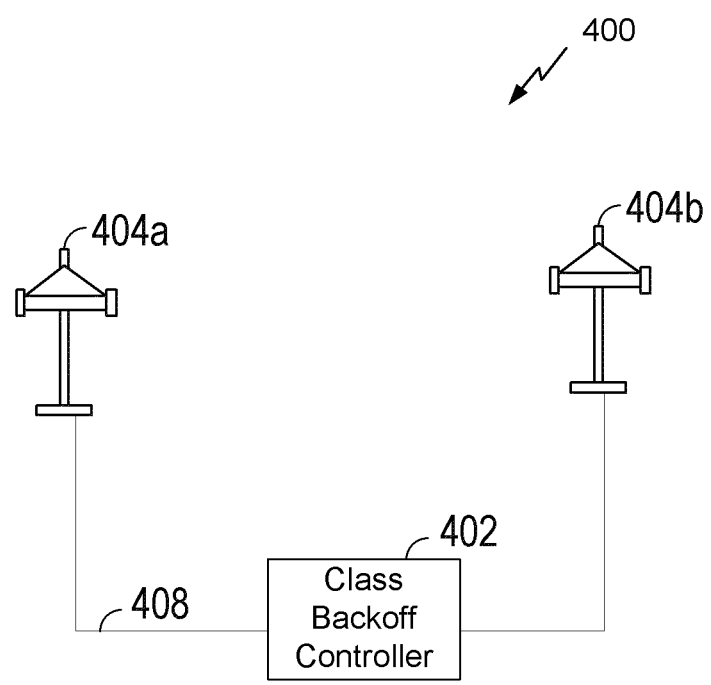
FIG. 4 illustrates two wireless networks and a centralized controller which may be used as part of a centralized group backoff scheme

FIG. 4 is a diagram 400 of a centralized controller which may be used as part of a centralized group backoff scheme. In this diagram 400, a centralized controller 402 is connected via backhaul 408 (physical wired connection) to two or more APs 404a, 404b, such as AP 404a and AP 404b. In some aspects, the centralized controller may also be connected to STAs 106. The centralized controller 402 may comprise a form of class backoff controller 135, in this case, a centralized type of class backoff controller 135, which may be able to communicate with multiple APs, such as APs 404a, 404b. In some aspects, the centralized controller 402 may be connected via a wireless connection to APs 404a, 404b. Each of these APs 404a, 404b may have a number of STAs 106 connected to them. Each communication to or from a STA 106 to the AP 404a may be assigned to a class of compatible TXOP, as described above. In this diagram, each AP 404a, 404b that wishes to allow access for a certain TXOP class may report its clear channel assessment (CCA) status, in real time, to the centralized controller 402 via the backhaul connection 408. The centralized controller may then run a single backoff for each TXOP class, and decrement the backoff counter only if the received CCA status from the plurality of devices satisfies certain conditions; for example the condition may refer to a desired number N of APs 106 report that the medium is idle. For example, the backoff counter may only be decremented if both AP 404a and AP 404b report that the medium is idle. When the backoff counter for a given TXOP class reaches zero, the controller 402 instructs each of the APs 404a, 404b with idle channels to start their TXOP for the given TXOP class. Because the backoff counter is only decremented when N or more APs 404a, 404b report that the medium is idle, it may be guaranteed that at least N APs 404a, 404b allow access to the given TXOP class at the same time, when instructed by the centralized control 402. The desired number N may be adapted based on several criteria, such as the number of APs which are a part of centralized backoff procedure, and may also be adjusted based on past events in the backoff procedure, such as how frequently certain classes of compatible TXOPs have been granted access to the wireless medium.

One disadvantage of the above scheme, however, is that such a scheme requires a centralized controller 402. In some deployments, using such a centralized controller 402 which is connected to each of the APs 104 and received real-time updates regarding their CCA status may be difficult. Accordingly, it may be beneficial to instead use a scheme which does not require a centralized controller 402, but which still provides some of the benefits of the above scheme, in allowing access to a given TXOP class to a number of TXOPs at the same time. Such a method may include performing a distributed (or decentralized) backoff procedure for the class. The distributed backoff procedure may comprise initializing a transmission from a first STA 106, which may also alert other nearby STAs 106 that it has gained access to the wireless medium. In some aspects, this procedure may be done by any type of STA 106, including an AP 104.

Figure 5:
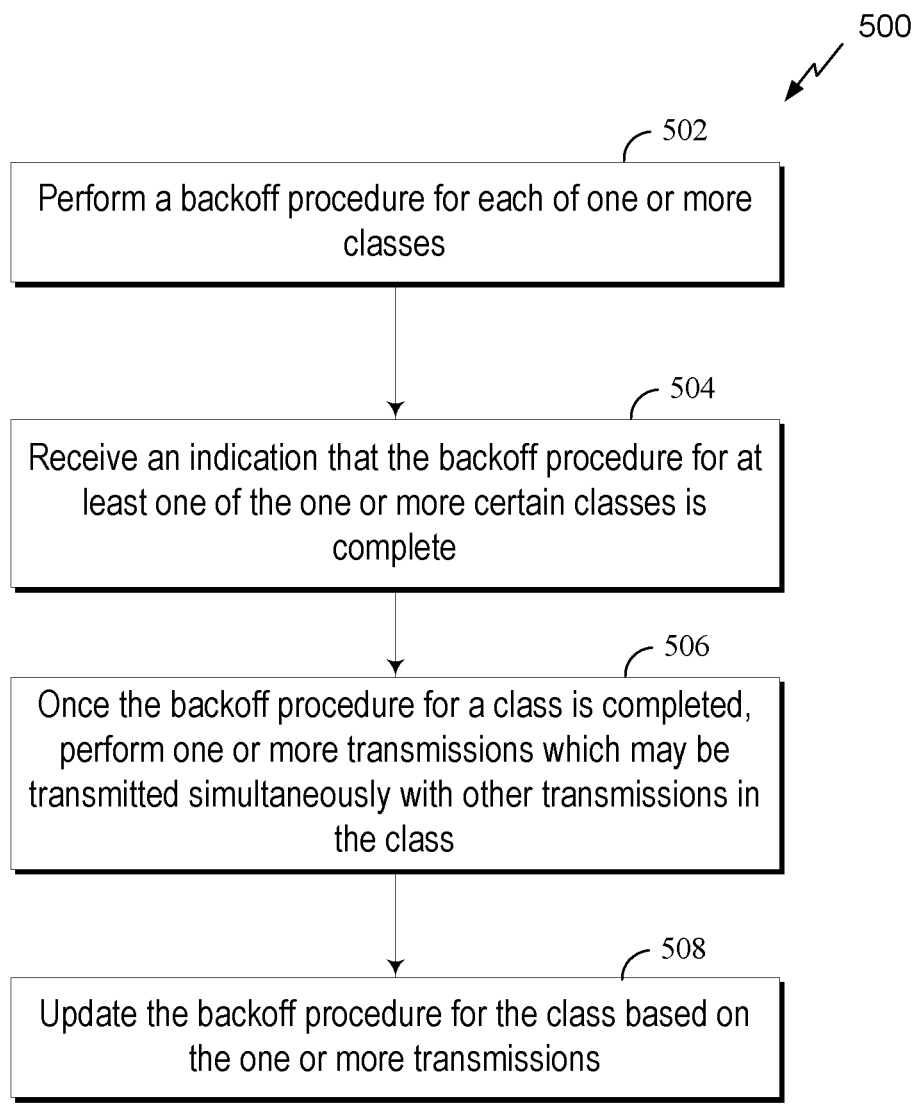
FIG. 5 is a flowchart of a method for performing a common medium access procedure for a transmission of packets of one or more certain classes.

FIG. 5 is an illustration of a method 500 for performing a common medium access procedure for a transmission of packets of one or more certain classes. This method may be performed by a wireless device 202 on a wireless network. For example, this method may be performed by an AP 104 or a STA 106.

At block 502, the wireless device 202 performs a backoff procedure for each of one or more classes. For example, the backoff procedure may include initiating a backoff counter, and decrementing this counter based upon a clear channel assessment of a wireless medium. For example, the counter may be configured to be decremented only when the channel is clear, and may not be decremented at times when the channel is in use. In some aspects, this backoff procedure may be initiated when the wireless device 202 wishes to transmit a packet which is a member of one or more classes. In some aspects, these classes may include a class such as a class of compatible TXOPs, as described above. In some aspects, the means for performing this backoff procedure may include a processor. In some aspects, this backoff procedure for a particular class may be common across a number of different devices. For example, a number of different devices may use the same backoff procedure for transmissions of the same class.

At block 504, the wireless device 202 receives an indication that the backoff procedure for at least one of the one or more certain classes is complete. For example, the wireless device 202 may include a module configured to generate an indication, such as when the counter for a certain class reaches zero. Accordingly, this indication may be received by the wireless device 202 from a module within the wireless device 202. In some aspects, this indication may also be received from another wireless device 202, which may have its own backoff counter for the class. In some aspects, the means for receiving this indication may include a processor and/or a receiver. The indication may be received from a neighboring wireless device 202, and may be an over the air (OTA) transmission, such as a new short control/management frame (NDP), to be sent at the beginning of a TXOP, which advertises a particular class identification, such as a class of compatible TXOPs identification, and a duration of the TXOP. The indication may also be received from within the wireless device 202, such as in a message from a counter contained within the wireless device 202.

Figure 7:
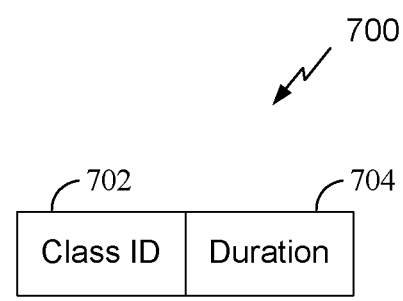
FIG. 7 is an exemplary packet which may be used to indicate to another device that access to the wireless medium has been granted to a device of a particular class.

At block 506, once the backoff procedure for a class is completed, as indicated by the indication, the wireless device 202 performs one or more transmissions which are transmittable simultaneously with other transmissions in the class. For example, the wireless device 202 may transmit one or more packets of a particular class. Each of these packets may be configured to be transmitted simultaneously with other packets of the same class. In some aspects, the wireless device 202 may indicate the class of a packet within the first transmitted packet, in order to alert other wireless devices of the opportunity to transmit packets of the class. In some aspects, this alert may comprise an indication, as illustrated in FIG. 7 below, including both an indication of the class of the packet and an indication of the duration of the transmission. For example, this duration may be used by other devices to ensure that transmissions of the given class by those devices are transmitted during the time which has been reserved for transmissions of the given class. In some aspects, the means for performing this transmission may include a processor and/or a transmitter. In some aspects, the wireless device 202 may determine a probability, based upon certain conditions designed to ensure that each device is given more equal access to the wireless medium. For example, when the backoff counter for a given class reaches zero, that class may be allowed to transmit only a certain percentage of the time, and may otherwise have to start a new backoff counter. For example, this percentage of the time may be a percentage that is calculated based upon certain fairness conditions. In some aspects, a transmission may be transmitted based, at least in part, on this determined probability.

At block 508, the wireless device 202 updates the backoff procedure for the class based on the one or more transmissions. For example, the wireless device 202 may reset a backoff counter for the particular class, or may turn off that backoff counter. In some aspects, the backoff counter may be reset if other transmissions of the class are desired to be transmitted, and may turn off the backoff counter if the device does not wish to transmit further transmission of that class. In some aspects, the wireless device 202 may also alter other backoff procedures for other classes. These alterations may be based on, for example, fairness conditions to allow access to other classes and to allow access to the wireless medium for devices which do not support class-based group backoff. For example, the wireless device 202, upon transmitting a packet of a certain class, may alter the backoff procedures of other classes in order to prioritize those classes over the certain class, or may alter the backoff procedures of other classes, in order to ensure that the wireless device allows fair access to the wireless medium to other wireless devices on the network. In some aspects, the means for updating the backoff procedure may include a processor.

Figure 6:
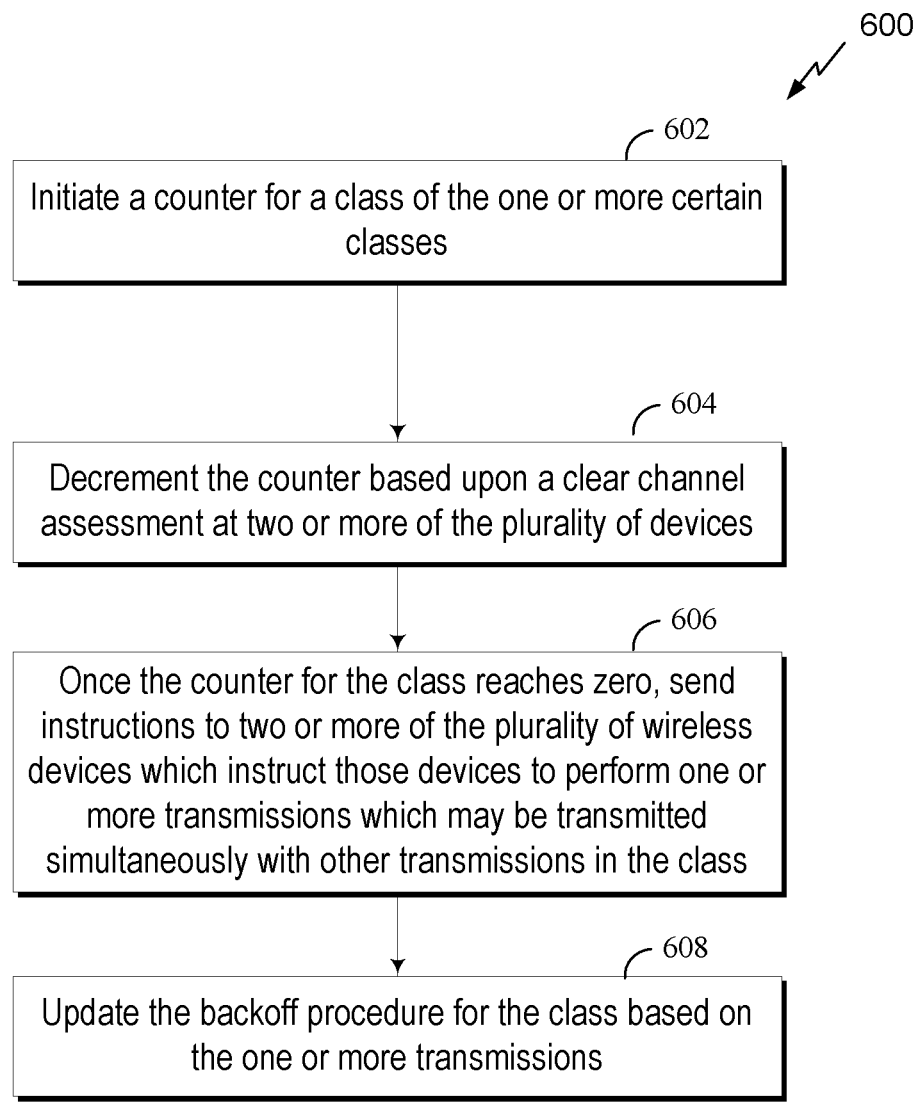
FIG. 6 is a flowchart of a method for performing a common medium access procedure for a transmission of packets of one or more certain classes.

FIG. 6 is an illustration of a method for performing a common medium access procedure for a transmission of packets of one or more certain classes. In some aspects, this method may be carried out on a centralized controller, such as class backoff controller 402. In some aspects, this class backoff controller 402 may be connected to a number of wireless devices 202, such as STAs 106 and APs 104. In some aspects, these connections may be backhaul connections, or wireless connections.

At block 602, the centralized controller initiates a counter for a class of the one or more certain classes. For example, the centralized controller may receive a request for a wireless device 202, indicating that the device wishes to transmit a packet of a certain class. Accordingly, the centralized controller may begin a counter for that certain class. In some aspects, the class may be a class of compatible TXOPs, as described above. In some aspects, the means for initiating a counter may include a processor.

At block 604, the counter for the class is decrementing based upon a clear channel assessment at two of more of the plurality of devices. For example, the centralized controller may receive CCAs from each of the connected wireless devices 202. The centralized controller may be configured to receive these clear channel assessments periodically, such as once per slot cycle. Based upon these received indications, the centralized controller may decrement backoff counters which may be running on the centralized controller, based on these assessments. In some aspects, counters may only be decremented if a particular number of connected wireless devices 202 report that the medium is idle. In some aspects, the medium may be said to be idle if the medium is idle for at least a given period of time, such as a slot length. The means for decrementing the counter may include a processor.

At block 606, once the counter for the class reaches zero, the centralized controller sends instructions to two or more of the plurality of wireless devices which instruct those devices to perform one or more transmissions which are transmittable simultaneously with other transmissions in the class. For example, the centralized controller may send an indication to each of the connected wireless devices, which indicates information such as a class ID of the TXOP and the duration of the TXOP. This indication may be similar to the indication of FIG. 7. In some aspects, this indication may be sent via a backhaul connection, a wireless connection, or some combination of the two. In some aspects, this indication may only be sent to devices which previously reported, in their clear channel assessment, that the medium was idle. For example, this indication may not be sent to devices that report that the medium is in use. In some aspects, the means for sending instructions may include one or more of a processor and a transmitter.

At block 608, the centralized controller updates the backoff procedure for the class based on the one or more transmissions. For example, the centralized controller may reset the counter for the class. The centralized controller may also turn off the counter for the class, until another device requests to transmit a packet of that class. The centralized controller may also adjust the backoff procedure for the class, such as changing the initial counter value or range. For example, the initial counter value or range for a given class may be increased after that class has been granted access to the wireless medium, in order to ensure fair access to the wireless medium between that class and other legacy devices. In some aspects, the backoff procedures for other classes may also be updated based upon the one or more transmissions, such as reducing the counter on those classes to give them preference over other classes. In some aspects, the means for updating the backoff procedures may include a processor.

In some aspects, the backoff procedure for a given class may include decrementing a counter. In some aspects, the counter for a given class may be decremented when a device determines that another device is transmitting a packet of the given class, even if the network is not sensed to be idle. This decrementing may be in addition to decrementing the counter when the network is sensed to be idle. That is, a counter for a given class may be decrementing both when the network is idle, and when that particular class is transmitting on the network. In some aspects, determinations of whether the medium is idle may be based upon whether the medium is idle for a point interframe space (PIES), which may be a period of time of a predefined duration. In some aspects, the backoff procedure for a given class may also include fairness safeguards, which may work to ensure certain classes are not given access to the wireless medium more frequently than other classes or more frequently than legacy devices which may not support simultaneous access to the wireless medium. The nature of these fairness safeguards may vary.

Generally, if all devices of a particular class were allowed immediate access to the network as soon as a backoff counter associated with any one of those devices reached zero, certain classes may receive more access to the network when there are more devices of that class nearby. For example, the network access time for a given class in that scenario may be equal to a minimum value of backoff1 and backoff2, where backoff1 is the backoff counter for a first device of that class, and backoff2 is the backoff counter for a second device of that class. In classes with a larger number of devices than two, access time may be equal to the lowest backoff counter among all backoff counters for that class. Thus, because larger classes would have more backoff counters, without fairness conditions, those larger classes may receive access to the network more frequently. Accordingly, fairness conditions may be desired which would allow other devices access to the network more frequently.

One potential fairness condition to this is to set the minimum initial backoff counter value for a class (CWmin) to be proportional to the number of devices taking part in the group backoff for that class. For example, if more devices take part in a group backoff procedure for a particular class, the CWmin for that class may be higher. This may help ensure fair access to the wireless medium for devices of the particular class and for legacy devices, as devices of the particular class may be granted access to the wireless medium at a rate comparable to the rate such access is granted to legacy devices. Accordingly, this may allow more efficient use of the wireless medium, without allowing "preferential" access to some devices over other legacy devices.

In some aspects, other fairness conditions may also be used. For example, other conditions may need to be satisfied prior to granting access to the wireless medium to devices of the particular class. These other fairness conditions may be used alone, or in combination with changing the CWmin as described above. These additional fairness conditions may promote equal access to the wireless medium between devices of a particular class and between legacy devices, and may limit disparity in access between different devices. A number of different fairness conditions could be used in order to reduce this disparity. In some aspects, it may be desirable to use a fairness condition which ensures that a third party or legacy device may not be disadvantaged by the group backoff procedure described above.

A residual backoff counter may be used as a fairness condition. A wireless device may transmit only if a residual backoff value is less than a certain threshold. Each wireless device 202 may have a residual backoff counter assigned to it, such that the device may not transmit more than a certain number of times within a certain time period. For example, a wireless device 202 may have a residual backoff counter such that the device must wait a certain number of slots after having access to the wireless medium before it may access the wireless medium again, regardless of the particular class of the device. Accordingly, in such a system, a device may transmit only if both transmissions of the class are allowed access to the network, and if the residual backoff counter for that class for that device is below a threshold. This may ensure that devices do not transmit messages of a certain class more often than a given amount (determined by the difference between the residual backoff counter's initial value and the threshold value). This residual backoff counter may be used together with other fairness conditions, or may be used on its own.

Another possible fairness condition is for a wireless device of a particular class to transmit only according to a probability value during a window in which the device may otherwise be able to transmit. For example, when a counter for a given class reaches zero, a device may only transmit a packet of that given class some proportion of the time, based upon a probability value. This probability value may be adjusted in such a manner as to allow fair access to the wireless medium for devices of the particular class and for other devices. Thus, if a device has just transmitted a transmission of a certain class, the probability value may be lower, while if the device has not transmitted in a given class for a long period of time, the probability value may be higher. For example, a probability of allowing access to a device of a particular class may be calculated according to the formula:

$$P = 2\frac{B_{avg}}{CW_{min}} \quad (1)$$

where P is a probability of allowing access to the wireless medium to the wireless device 202 of the particular class, Bavg is the average effective backoff period over some time period for the wireless device 202 of the particular class, and where CWmin is the minimum initial backoff value for the particular class, as described above. Accordingly, the use of this probability P may allow for increased fairness between devices of a particular class and legacy devices. This probability value may be used separately from other fairness conditions, or may be used in conjunction with other fairness conditions.

FIG. 7 is an exemplary packet 700 which may be used to indicate to another device that access to the wireless medium has been granted to a device of a particular class. For example, packet 700 may be transmitted from a wireless device 202 to other neighboring wireless devices when access to the wireless medium is granted to the device 202 for transmission. For example, packet 700 may be transmitted at or near the beginning of a transmission of a particular class on the wireless medium.

The packet 700 may include a class identification 702. This class identification 702 may include information sufficient to identify a class of device that is being granted access to the wireless medium. For example, this class identification 702 may include a BSSID, or another device identifier. The class identification 702 may further include information on whether the device is being granted uplink access or downlink access to the wireless medium. The class identification 702 may include a numeric identifier of the class that has access to the wireless medium.

The packet 700 may further include a duration 704. This duration 704 may contain information sufficient to inform other wireless devices the duration for which the wireless medium is reserved for the transmission of the particular class. For example, this duration 704 may be listed in a number of milliseconds, seconds, or other unit of time. The duration 704 may also be indicated by indicating a number of slots of a known duration which are reserved for the wireless device 202 of the particular class. In some aspects, the packet 700 may also contain other information, in addition to the class identification 702 and the duration 704. In some aspects, the information of packet 700 may instead be transmitted as part of a larger packet, such as in a frame header of a frame. For example, this information may be transmitted as part of a frame header from a packet that wireless device 202 may transmit on the network, or may be transmitted by an AP when granting access to the network to a particular class.

Figure 8:
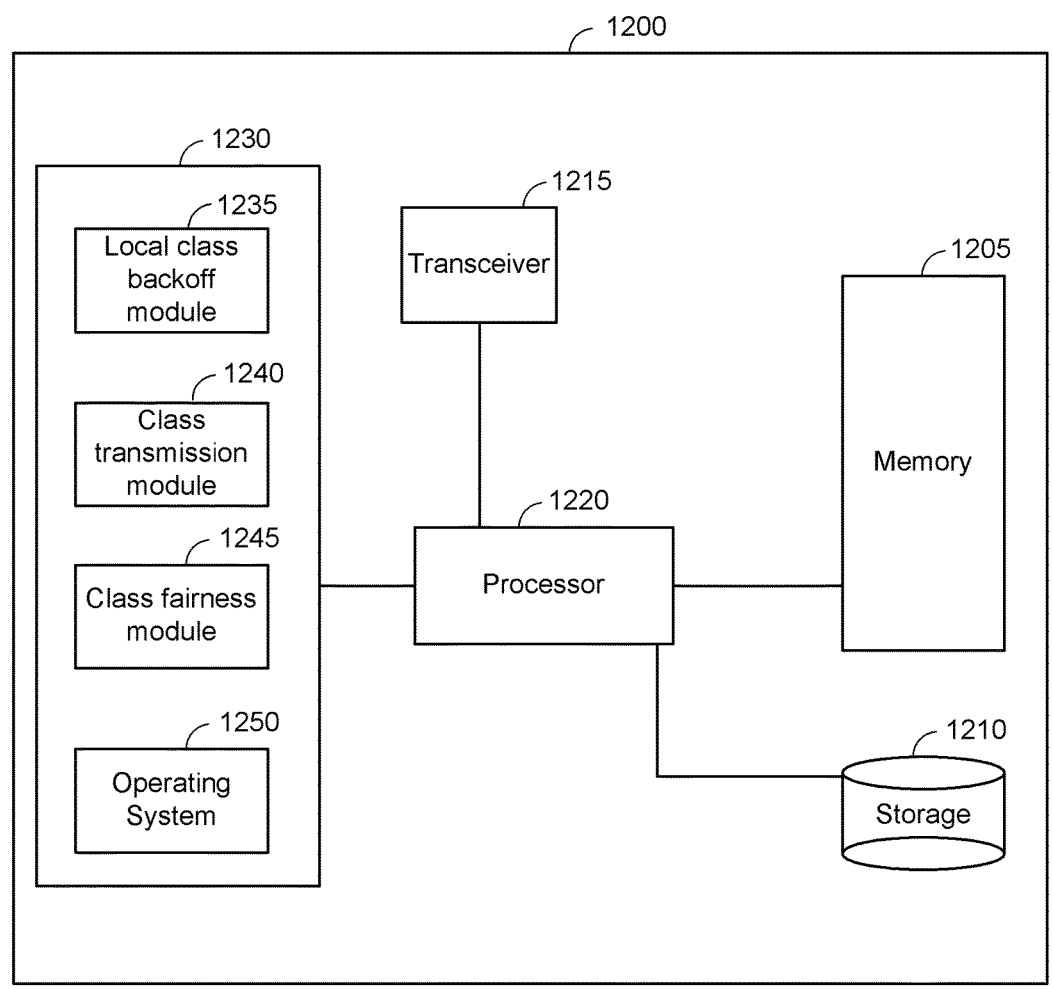
FIG. 8 depicts a high-level block diagram of a device having a set of components including a processor operatively coupled to a transceiver.

FIG. 8 depicts a high-level block diagram of a device 1200 having a set of components including a processor 1220 operatively coupled to a transceiver 1215. A working memory 1205, storage 1210, and memory 1230 are also in communication with and operative attached to the processor. Device 1200 may be a device configured to operate on a wireless communications network. Device 1200 may be configured to use the class backoff procedures described herein.

The transceiver 1215 may be configured to transmit and receive communications on the wireless communication network. It may be implemented as a transceiver 1215, or as a separate receiver and transmitter. In either case, the transceiver 1215 may be operable connected to a processor 1220, in order to allow the device to transmit and receive on the wireless medium according to certain class backoff principles.

Processor 1220 may be a general purpose processing unit or a processor specially designed for the disclosed methods. As shown, the processor 1220 is connected to a memory 1230 and a working memory 1205. In the illustrated embodiment, the memory 1230 stores local class backoff module 1235, class transmission module 1240, class fairness module 1245, and operating system 1250. These modules include instructions that configure the processor to perform various tasks. Working memory 1205 may be used by processor 1220 to store a working set of processor instructions contained in the modules of memory 1230. Alternatively, working memory 1205 may also be used by processor 1220 to store dynamic data created during the operation of device 1200.

As mentioned above, the processor 1220 is configured by several modules stored in the memories. For example, the local class backoff module 1235 may include instructions sufficient to configure the processor 1220 to perform local class backoff. For example, this may include starting and incrementing or decrementing a timer for one or more different classes of communication that the device 1200 wishes to transmit. For example, the local class backoff module 1235 may be configured to determine the class of a given transmission that is queued, and to begin an appropriate class backoff procedure for transmissions of that class.

The memory 1230 may also contain a class transmission module 1240. The class transmission module 1240 may contain instructions sufficient to configure the processor 1220 to transmit a transmission that is a member of a given class, using the transceiver 1215. For example, the class transmission module 1240 may be configured to transmit a transmission of a given class when the local class backoff module 1235 indicates that the backoff period for that class has ended. In this instance, the class transmission module 1240 may be configured to transmit an indication that the device 1200 will transmit in that class, and may be configured to further transmit the transmission in the class. The class transmission module 1240 may contain further instructions, which may allow the processor to receive an indication from another device that the other device will transmit in a given class. The class transmission module 1240 may then determine if the device 1200 has queued transmissions in that given class, and may be configured to transmit those transmissions during a provided transmission window for the given class. For example, class transmission module 1240 may receive an indication that another device will transmit a transmission in class 1 from a start time to an end time. The class transmission module 1240 may then determine if the device 1200 has any transmission queued in class 1, and may be configured to transmit all or part of those transmissions during the provided time period.

The memory 1230 may also contain a class fairness module 1245. The class fairness module 1245 may be configured to ensure fair access to the wireless medium for transmissions of all the various classes. For example, the class fairness module 1245 may be configured to determine initial backoff counter values, based on a number of times that transmissions of that class have been allowed on the wireless medium in a certain time period. The class fairness module 1245 may also contain instructions sufficient to configure the processor 1220 to determine whether or not to transmit a transmission in a certain class even when an indication is received, based on how often that class has been allowed access to the wireless medium as described above.

Operating system module 1250 configures the processor to manage the memory and processing resources of device 1200. For example, operating system module 1250 may include device drivers to manage hardware resources such as the image sensor 1215 or storage 1210. Therefore, in some embodiments, instructions contained in modules discussed above may not interact with these hardware resources directly, but instead interact through standard subroutines or APIs located in operating system component 1250. Instructions within operating system 1250 may then interact directly with these hardware components.

Processor 1220 may write data to storage module 1210. While storage module 1210 is represented graphically as a traditional disk device, those with skill in the art would understand multiple embodiments could include either a disk based storage device or one of several other type storage mediums to include a memory disk, USB drive, flash drive, remotely connected storage medium, virtual disk driver, or the like.

FIG. 8 depicts a device having separate components to include a processor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 8 shows two memory components, to include memory component 1230 having several modules, and a separate memory 1205 having a working memory, one with skill in the art would recognize several embodiments utilizing different memory architectures. For example, a design may utilize ROM or static RAM memory for the storage of processor instructions implementing the modules contained in memory 1230. Alternatively, processor instructions may be read at system startup from a disk storage device that is integrated into device 1200 or connected via an external device port. The processor instructions may then be loaded into RAM to facilitate execution by the processor. For example, working memory 1205 may be a RAM memory, with instructions loaded into working memory 1205 before execution by the processor 1220.

Figure 9:
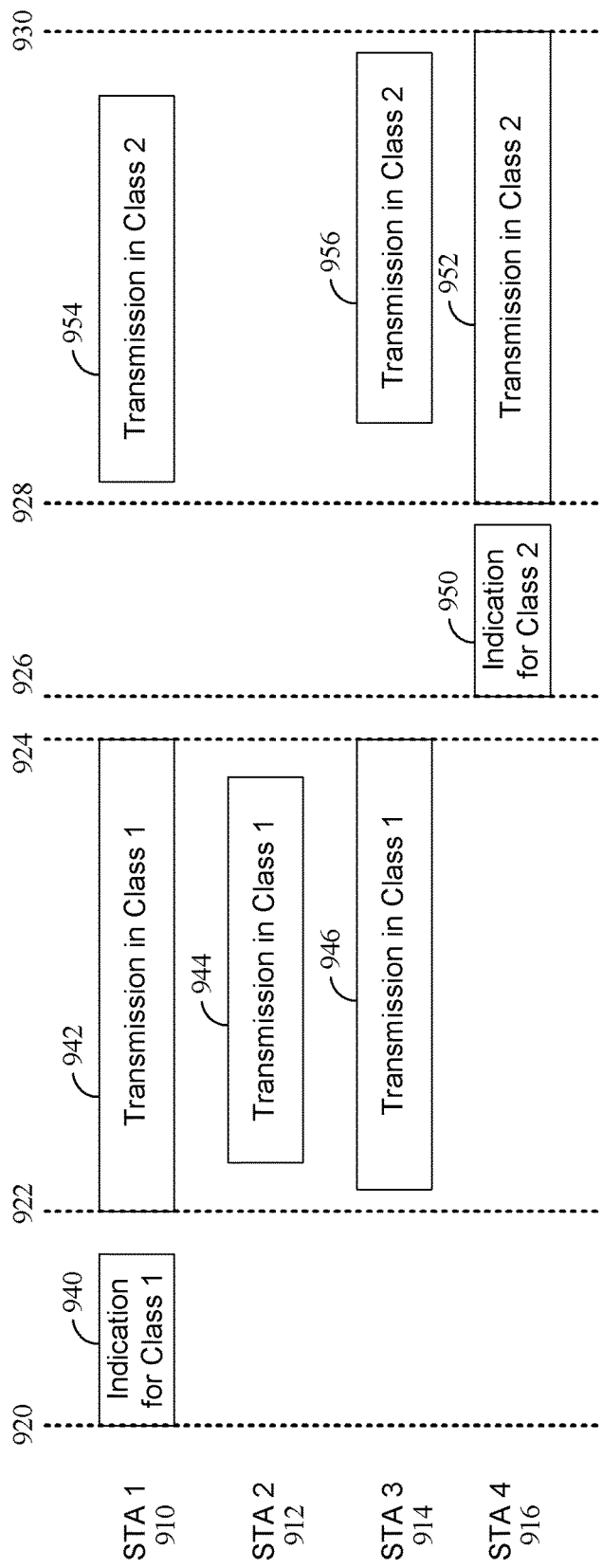
FIG. 9 is an illustration of certain aspects of the present disclosure in use, such as a decentralized group backoff.

FIG. 9 is an illustration of certain aspects of the present disclosure in use, such as a decentralized group backoff. For example, four or more wireless devices, here labeled as STAs 1-4 910, 912, 914, 916, may share a wireless medium. In some aspects, some of these devices may be APs and others may be STAs.

Each of the wireless devices may wish to transmit one or more transmissions, at certain times. Each of these transmissions may be of a class, where a class is defined such that transmissions in that class may be transmitted simultaneously with other transmissions that are in the same class. That is, multiple transmissions in any given class may be transmitted simultaneously with each other, without interfering with one another. Each of the STAs may be configured to operate according to certain decentralized group backoff procedures, as described herein.

At a first time 920, STA 1 910 may transmit an indication for class 1 940. For example, STA 1 910 may wish to transmit a transmission that is in class 1. Thus, at some point prior to time 920, STA 1 910 may begin a backoff procedure for class 1. For example, this backoff procedure may involve beginning a timer or a countdown number with a certain initial value. This timer may be decremented at certain times. For example, the timer may initially be set to some value, say 10, and decremented during each time period, such as a beacon interval, during which the wireless medium is not in use. Other initial values may be used, and other conditions for decrementing the counter may also be used. Regardless of the initial value or the conditions for decrementing the timer, STA 1 910 at time 920 may determine that it is time to transmit a transmission in class 1. For example, this determination may occur because the timer for class 1 may reach zero. Thus, STA 1 910 may transmit an indication for class 1 940 at time 920.

This indication 940 may indicate a start time 922 and an end time 924 for a transmission in class 1 942 that will be transmitted by STA 1 910. In some aspects, the indication 940 may be a stand-alone indication, or may, for example, be a packet header for the transmission 942. The start time 922 and the end time 924 may be indicated directly in the indication 940 (such as including a start time and an end time), or may be inferred. For example, the indication 940 may note that the transmission 942 will begin some time after the indication (either immediately after, or a certain known duration after), and may indicate a duration of the transmission 942. Thus, the indication 940 may contain information sufficient for other devices to determine a start time 922 and an end time 924.

After transmitting the indication 940, the STA 1 910 may transmit its transmission in class 1 942 between the start time 922 and the end time 924. During this time, other devices which received the indication 940 may be aware that a class 1 transmission is taking place. Thus, those other devices may be configured to also transmit class 1 transmissions during this time. For example, STA 2 912 may transmit a transmission in class 1 944 between the start time 922 and the end time 924. Further, STA 3 914 may also transmit a transmission in class 1 946 during this time. These transmissions from other devices may be transmitted even though backoff counters on those devices (such as a timer for class 1) may not indicate that it is time to transmit in that class. Instead, these transmissions may occur based on the received indication 940 from STA 1 910. In some aspects, certain STAs, such as STA 4 916, may not transmit during the time between the start time 922 and the end time 924. For example, STA 4 916 may not have any class 1 data that it needs to transmit, and thus, may choose to defer to the class 1 transmissions during this time period.

After a device has transmitted in class 1, the device may update its own backoff procedure for class 1. For example, if a device has no more class 1 transmissions pending, the device may stop the timer for that class. If a device still has one or more class 1 transmissions that it wishes to transmit, the device may update the procedure in other ways. For example, the device may re-start a timer at an initial value. The device may also adjust this initial value, in order to ensure certain fairness conditions, as described above.

Similarly, at a future time 926, another device such as STA 4 916 may transmit an indication 950 for another class, such as class 2. This indication may include information sufficient to determine a start time 928 and an end time 930. Between those times, STA 4 916 may transmit in class 2 952. Similarly, other devices which have transmission in class 2 pending may also transmit those class 2 transmissions. Accordingly, it may be observed that the use of class backoff procedures may allow devices to transmit certain compatible messages (messages in the same class) over the wireless medium simultaneously. These transmissions may be made when either a device's own backoff procedure indicates the transmission may begin, or when another device's backoff procedure indicates the transmission may begin.

Figure 10:
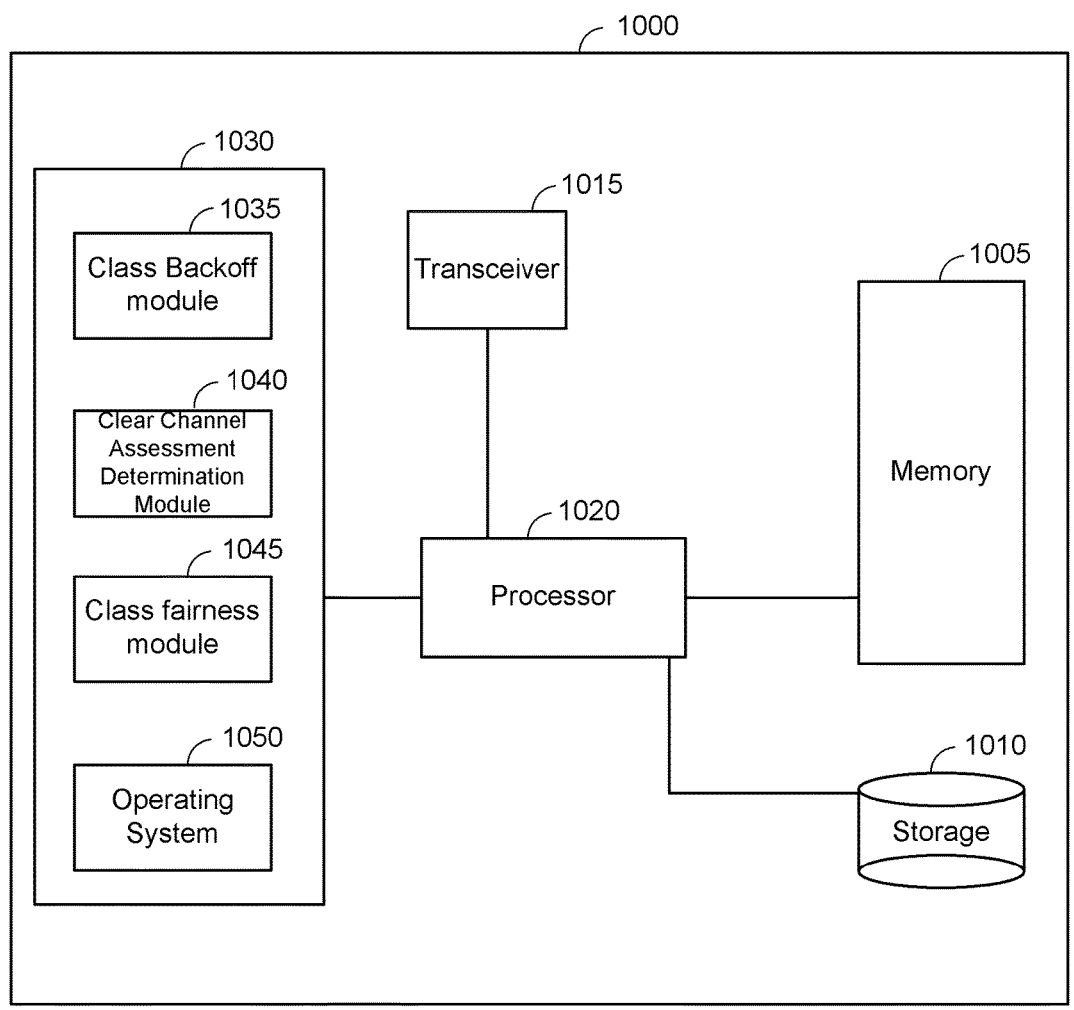
FIG. 10 depicts a high-level block diagram of a device having a set of components including a processor operatively coupled to a transceiver.

FIG. 10 depicts a high-level block diagram of a device 1000 having a set of components including a processor 1020 operatively coupled to a transceiver 1015. A working memory 1005, storage 1010, and memory 1030 are also in communication with and operative attached to the processor. Device 1000 may be a device configured to operate on a wireless communications network. Device 1000 may be configured to use the class backoff procedures described herein, such as being configured to operate as a centralized class backoff controller.

The transceiver 1015 may be configured to transmit and receive communications on the wireless communication network. It may be implemented as a transceiver 1015, or as a separate receiver and transmitter. In either case, the transceiver 1015 may be operable connected to a processor 1020, in order to allow the device to transmit and receive on the wireless medium according to certain class backoff principles. For example, the transceiver 1015 may be able to transmit to other devices, in order to indicate that an opportunity to transmit on a certain class has arrived.

Processor 1020 may be a general purpose processing unit or a processor specially designed for the disclosed methods. As shown, the processor 1020 is connected to a memory 1030 and a working memory 1005. In the illustrated embodiment, the memory 1030 stores local class backoff module 1035, class transmission module 1040, class fairness module 1045, and operating system 1050. These modules include instructions that configure the processor to perform various tasks. Working memory 1005 may be used by processor 1020 to store a working set of processor instructions contained in the modules of memory 1030. Alternatively, working memory 1005 may also be used by processor 1020 to store dynamic data created during the operation of device 1000.

As mentioned above, the processor 1020 is configured by several modules stored in the memories. For example, the class backoff module 1035 may include instructions sufficient to configure the processor 1020 to perform class backoff for any number of classes of transmissions. For example, this may include starting and incrementing or decrementing a timer for one or more different classes of communication. For example, the device 1000 may receive an indication from a wireless communication device that the device wishes to transmit a transmission of a certain class. The class backoff module 1035 may contain instructions sufficient to configure the device 1000 to receive that indication, and to determine the class of the transmission, and whether or not a counter for that class is currently running. If a counter for the class is not running, the class backoff module 1035 may contain instructions sufficient to initiate such a counter for the class.

The memory 1030 may also contain a clear channel assessment determination module 1040. For example, a number of wireless devices may be configured to transmit a clear channel assessment (CCA) to the device 1000. The clear channel assessment determination module 1040 may be configured to receive each of these CCA values, and to use those values to determine whether or not the wireless medium is clear. For example, the clear channel assessment determination module 1040 may be configured to determine that the wireless medium is clear if two or more received CCA values indicate that the medium is clear.

The clear channel assessment determination module 1040 may then be configured to transmit this clear value to the class backoff module 1035, which may be configured to decrement one or more running counters based upon this assessment. If this decrementing results in one of the class timers reaching zero, the class backoff module 1035 may be further configured to transmit a message to one or more devices, using the transceiver 1015. For example, this message may be an indication, which may indicate to those devices that they may transmit a transmission of the given class for a certain duration of time. The class backoff module 1035 may be configured to generate these indications and their duration based on messages received from other wireless devices, the messages indicating a class and a duration of transmissions that those wireless devices would like to transmit.

The memory 1030 may also contain a class fairness module 1045. The class fairness module 1045 may be configured to ensure fair access to the wireless medium for transmissions of all the various classes. For example, the class fairness module 1045 may be configured to determine initial backoff counter values for the class backoff module 1035, based on a number of times that transmissions of that class have been allowed on the wireless medium in a certain time period. The class fairness module 1045 may also contain instructions which instruct the device 1000 when it should decrement certain counters, based on class fairness and based on CCA values determined by the clear channel assessment determination module 1040.

Operating system module 1050 configures the processor to manage the memory and processing resources of device 1000. For example, operating system module 1050 may include device drivers to manage hardware resources such as the image sensor 1015 or storage 1010. Therefore, in some embodiments, instructions contained in modules discussed above may not interact with these hardware resources directly, but instead interact through standard subroutines or APIs located in operating system component 1050. Instructions within operating system 1050 may then interact directly with these hardware components.

Processor 1020 may write data to storage module 1010. While storage module 1010 is represented graphically as a traditional disk device, those with skill in the art would understand multiple embodiments could include either a disk based storage device or one of several other type storage mediums to include a memory disk, USB drive, flash drive, remotely connected storage medium, virtual disk driver, or the like.

FIG. 10 depicts a device having separate components to include a processor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 10 shows two memory components, to include memory component 1030 having several modules, and a separate memory 1005 having a working memory, one with skill in the art would recognize several embodiments utilizing different memory architectures. For example, a design may utilize ROM or static RAM memory for the storage of processor instructions implementing the modules contained in memory 1030. Alternatively, processor instructions may be read at system startup from a disk storage device that is integrated into device 1000 or connected via an external device port. The processor instructions may then be loaded into RAM to facilitate execution by the processor. For example, working memory 1005 may be a RAM memory, with instructions loaded into working memory 1005 before execution by the processor 1020.

Figure 11:
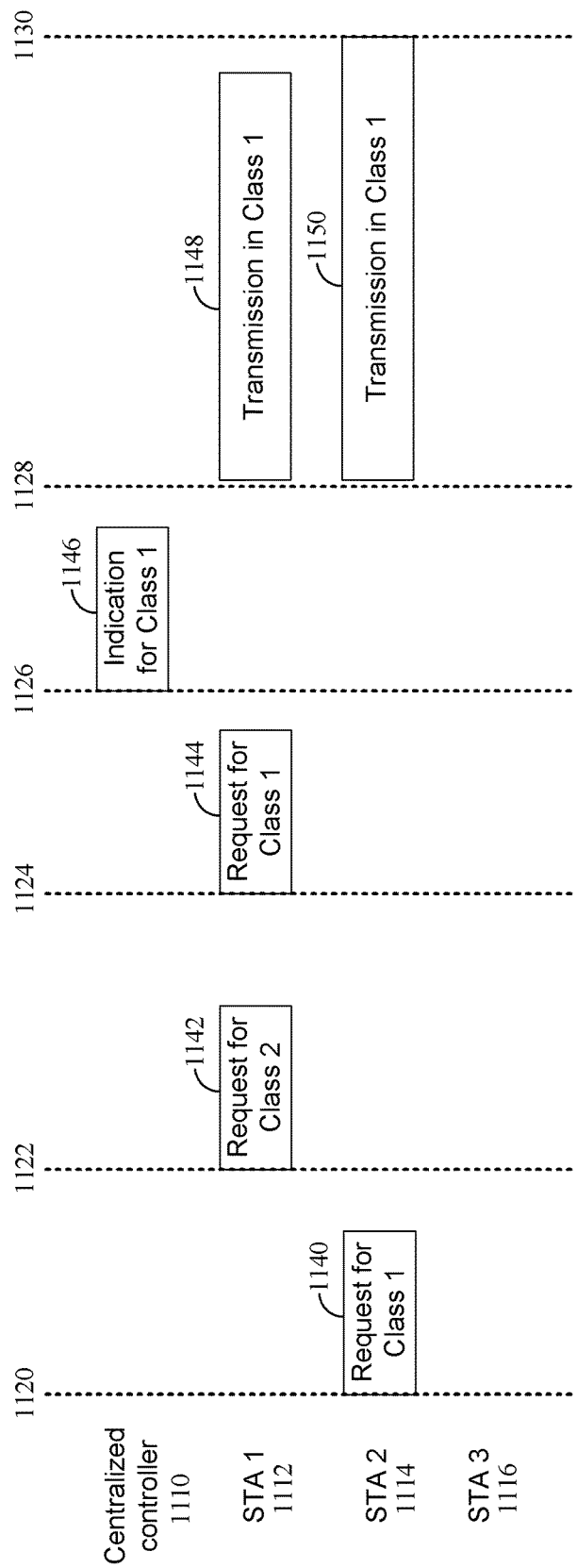
FIG. 11 is an illustration of certain aspects of the present disclosure in use, such as a centralized group backoff.

FIG. 11 is an illustration of certain aspects of the present disclosure in use, such as a centralized group backoff. For example, three or more wireless devices, here labeled as STAs 1-3 1110, 1112, 1114 may share a wireless medium. Additionally, there may be a centralized controller 1100. In some aspects, some of these devices may be APs and others may be STAs, and the devices may be in communication with the centralized controller 1110.

Each of the wireless devices may wish to transmit one or more transmissions, at certain times. Each of these transmissions may be of a class, where a class is defined such that transmissions in that class may be transmitted simultaneously with other transmissions that are in the same class. That is, multiple transmissions in any given class may be transmitted simultaneously with each other, without interfering with one another. Each of the STAs may be configured to operate according to certain centralized group backoff procedures, as described herein.

At a first time 1120, STA 2 1114 may send a request for class 1 1140. For example, the request 1140 may indicate that STA 2 1114 has buffered data that it wishes to transmit, and that the transmission will be a class 1 transmission. Accordingly, the STA 2 1114 may be configured to send a request 1140 to the centralized controller 1110. The centralized controller 1110 may receive the request. If the centralized controller 1110 does not have a backoff counter initiated for class 1, the centralized controller 1110 may be configured to initiate a backoff counter for class 1. The centralized controller 1110 may also receive other requests for various other classes, either the same class (like request 1144) or different classes (like request 1142). Each device may transmit one or more requests for one or more classes. The centralized controller 1110 may be configured to receive each request, and to operate backoff counters accordingly. For example, the centralized controller 1110 may operate a backoff counter for each of class 1 and class 2. These backoff counters may be configured to enforce certain fairness conditions, such as allowing each class of transmission equal access to the wireless medium. Such fairness conditions may be enforced by, for example, altering the initial backoff value or altering the decrementing procedures for one or more classes.

At a time 1126, the centralized controller 1110 may transmit an indication for class 1 1140. For example, the centralized controller 1110 may transmit this indication when a backoff counter for class 1 reaches zero.

This indication 1140 may indicate a start time 1128 and an end time 1130 for a transmissions in class 1. The duration of time that the centralized controller 1140 allows for class 1 (such as the amount of time between the start time 1128 and the end time 1130) may be based, at least in part, on one or more requests. For example, each of request 1140 and 1144 may include a duration of a transmission that STA 1 1112 and STA 2 1114 wish to transmit a transmission of class 1. Thus, these times may be used, at least in part, to determine a duration of time that class 1 transmissions may be granted access to the wireless medium, as indicated in the indication 1146.

In some aspects, the indication 1140 may be a stand-alone indication, or may, for example, be included in another transmission from the centralized controller 1110. The start time 1128 and the end time 1130 may be indicated directly in the indication 1140 (such as including a start time and an end time), or may be inferred. For example, the indication 1140 may note that the transmission 1142 will begin some amount of time after the indication (either immediately after, or a certain known duration after), and may indicate a duration of the transmission 1142. Thus, the indication 1140 may contain information sufficient for other devices to determine a start time 1128 and an end time 1130.

After receiving the indication 1146, each device that has queued data of the given class, here class 1, may be configured to transmit data in that class between the start time 1128 and the end time 1130. For example, STA 1 1112 may transmit 1148 in class 1, and STA 2 1114 may similarly transmit 1150 in class 1 during that time. Other devices which do not have buffered class 1 data, such as STA 3 1116, may defer during the time period, such that they do not interfere with the class 1 transmissions 1148, 1150. After end time 1130, the centralized controller 1110 may provide other indications for other classes, such as class 2, when the backoff counter for each of those classes reach zero.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for a device to perform a common medium access procedure for the transmission of packets of one or more certain classes, the method comprising:
    initiating, by the device, a backoff procedure for one of the certain classes, wherein initiating the backoff includes initiating a back-off counter at the device, and decrementing the back-off counter at the device depending on a clear channel assessment state at the device, and wherein the backoff procedure includes sending an indication of the clear channel assessment state to a central controller;
    receiving, by the device, an indication from the central controller that a common backoff procedure for the class has been completed based on a clear channel assessment state reported to the central controller from two or more of the devices;
    performing, by the device, one or more transmissions in response to receiving the indication, independent of whether the initiated back-off procedure indicates it is time to transmit in that class; and
    updating, by the device, the backoff procedure for the class based on the one or more transmissions.

2. The method of claim 1, further comprising updating the backoff procedures for each of the one or more certain classes based on the one or more transmissions.

3. The method of claim 1, wherein initiating one or more transmissions which may be transmitted simultaneously with other transmissions in the class comprises transmitting a first packet of the class from when the counter at the device reaches zero, the packet identifying the class.

4. The method of claim 3, wherein identifying the class comprises including in the transmitted first packet an indication describing the class.

5. The method of claim 3, wherein transmitting the first packet of the class comprises transmitting a clear to send or data packet indicating the class.

6. The method of claim 1, wherein updating the backoff procedures for the class based on the one or more transmissions comprises updating the backoff procedure for the class based on one or more fairness conditions.

7. The method of claim 1, further comprising receiving a message from the other device including the indication, the message further including a second indication of a time range for transmission by the device in the one class.

8. The method of claim 7, wherein the message includes a duration of the time range.

9. The method of claim 7, wherein the message includes a start time and an end time for transmissions in the one class.

10. The method of claim 7, wherein the indication is either a standalone indication or is included in another transmission from the other device.

11. The method of claim 10, wherein the indication is a standalone indication.

12. A device for performing a common medium access procedure for the transmission of packets of one or more certain classes, the device comprising:
    a processor configured to:
        initiate a backoff procedure for one of the certain classes, wherein the initiating of the backoff includes initiating a back-off counter at the device, and decrementing the back-off counter at the device depending on a clear channel assessment state at the device, and wherein the backoff procedure includes sending an indication of the clear channel assessment state to a central controller;
        receive an indication from the central controller that a common backoff procedure for the class has been completed based on the reported clear channel assessment state from two or more of the devices;
        perform one or more transmissions in response to receiving the indication, independent of whether the initiated back-off procedure indicates it is time to transmit in that class; and update the backoff procedures for the class based on the one or more transmissions.

13. The device of claim 12, the processor further configured to update the backoff procedures for each of the one or more certain classes based on the one or more transmissions.

14. The device of claim 12, wherein initiating a backoff procedure for each of the one or more certain classes comprises initiating a counter at the device, and decrementing the counter at the device depending on a clear channel assessment indication at the device.

15. The device of claim 12, wherein initiating one or more transmissions which may be transmitted simultaneously with other transmissions in the class comprises transmitting a first packet of the class from when the counter at the device reaches zero, the packet identifying the class.

16. The device of claim 15, wherein identifying the class comprises including in the transmitted first packet an indication describing the class.

17. The device of claim 15, wherein transmitting the first packet of the class comprises transmitting a clear to send or data packet indicating the class.

18. The device of claim 12, wherein the backoff procedure for each of the one or more certain classes comprise a backoff procedure performed on a single device that controls transmissions of a plurality of devices.

19. The device of claim 12, wherein updating the backoff procedures for the class based on the one or more transmissions comprises updating the backoff procedure for the class based on one or more fairness conditions.

20. A device for performing a common medium access procedure for the transmission of packets of one or more certain classes, the device comprising:
    initiating a backoff procedure for one of the certain classes, wherein the initiating of the backoff includes initiating a back-off counter at the device, and decrementing the back-off counter at the device depending on a clear channel assessment state at the device, and wherein the backoff procedure includes sending an indication of the clear channel assessment state to a central controller;
    means for receiving an indication from the central controller that a common backoff procedure for the class has been completed based on the reported clear channel assessment state from two or more of the devices;
    means for—performing one or more transmissions in response to receiving the indication, independent of whether the initiated back-off procedure indicates it is time to transmit in that class; and
    means for updating the backoff procedures for the class based on the one or more transmissions.

21. A non-transitory physical computer storage comprising computer executable instructions configured to implement a method for performing a common medium access procedure for the transmission of packets of one or more certain classes, the method comprising:
    initiating, by the device, a backoff procedure for one of the certain classes, wherein the initiating of the backoff includes initiating a back-off counter at the device, and decrementing the back-off counter at the device depending on a clear channel assessment state at the device, and wherein the backoff procedure includes sending an indication of the clear channel assessment state to a central controller;
    receiving, by the device, an indication from the central controller that a common backoff procedure for the class has been completed based on the reported clear channel assessment state from two or more of the devices;
    performing, by the device, one or more transmissions in response to receiving the indication, independent of whether the initiated back-off procedure indicates it is time to transmit in that class; and
    updating the backoff procedures for the class based on the one or more transmissions.

22. A method for a device to perform a common medium access procedure for the transmission of packets of one or more certain classes by a plurality of devices, the method comprising:
    initiating, by the device, a common backoff procedure for a class of the one or more certain classes, wherein initiating the common backoff includes initiating a back-off counter at the device, and decrementing the back-off counter at the device depending on a clear channel assessment state at the device;
    receiving, by the device, idle channel indications from two or more other devices of the plurality of devices;
    advancing the common backoff procedure based upon the received idle channel indications;
    once the common backoff procedure for the class is completed, sending, by the device, instructions to two or more of the plurality of devices which instruct those devices to perform one or more transmissions which may be transmitted simultaneously with other transmissions in the class which are transmitted by one or more other devices and independent of whether a backoff procedure initiated at the two or more of the plurality of devices indicates it is time to transmit in that class; and
    updating, by the device, the common backoff procedure for the class based on the one or more transmissions.

23. The method of claim 22, wherein the backoff procedure is advanced if a wireless medium is indicated to be idle by the clear channel assessment for at least a slot time at two or more of the plurality of devices.

24. The method of claim 22, wherein the backoff procedure is advanced if idle channel indications are received from at least a chosen number of the plurality of devices, wherein the chosen number is larger than two.

25. The method of claim 22, wherein sending instructions to two or more of the plurality of devices comprises sending instructions to two or more of the plurality of devices using a backhaul connection.

26. The method of claim 22, further comprising updating the backoff procedures for each of the one or more certain classes based on the one or more transmissions.

27. A device for performing a common medium access procedure for the transmission of packets of one or more certain classes by a plurality of devices, the device comprising:
    a hardware processor configured to:
        initiate, by the device, a common backoff procedure for a class of the one or more certain classes, wherein initiating the common backoff includes initiating a back-off counter at the device, and decrementing the back-off counter at the device depending on a clear channel assessment state at the device;
        receive idle channel indications from two or more other devices of the plurality of devices;
        advance the common backoff procedure based upon the received idle channel indications;
        once the common backoff procedure for the class is completed, sending instructions to two or more of the plurality of devices and independent of whether a backoff procedure initiated at the two or more of the plurality of devices indicates it is time to transmit in that class; and update the common backoff procedure for the class based on the one or more transmissions.

28. The device of claim 27, wherein the hardware processor is configured to advance the common backoff procedure if a wireless medium is indicated to be for at least a slot time at two or more of the plurality of devices.

29. The device of claim 27, wherein the hardware processor is configured to advance the common backoff procedure when idle indications are received from a chosen number of the plurality of devices, wherein the chosen number is larger than two.

30. The device of claim 27, wherein sending instructions to two or more of the plurality of devices comprises sending instructions to two or more of the plurality of devices using a backhaul connection.

31. The device of claim 27, the processor further configured to update the common backoff procedures for each of the one or more certain classes based on the one or more transmissions.

32. A device for performing a common medium access procedure for the transmission of packets of one or more certain classes by a plurality of devices, the device comprising:

means for initiating a common backoff procedure for a class of the one or more certain classes, wherein initiating the common backoff includes initiating a back-off counter at the device, and decrementing the back-off counter at the device depending on a clear channel assessment state at the device;

means for receiving, by the device, idle channel indications from two or more other devices of the plurality of devices;

means for advancing the common backoff procedure based upon the received idle channel indications;

means for sending instructions, once the common backoff procedure for the class is completed, to two or more of the plurality of devices which instruct those devices to perform one or more transmissions which may be transmitted simultaneously with other transmissions in the class which are transmitted by one or more other devices and independent of whether a backoff procedure initiated at the two or more of the plurality of devices indicates it is time to transmit in that class; and means for updating the common backoff procedure for the class based on the one or more transmissions.

33. A non-transitory physical computer storage comprising computer executable instructions configured to implement a method for a device to perform a common medium access procedure for the transmission of packets of one or more certain classes by a plurality of devices, the method comprising:

initiating, by the device, a common backoff procedure for a class of the one or more certain classes, wherein initiating the common backoff includes initiating a back-off counter at the device, and decrementing the back-off counter at the device depending on a clear channel assessment state at the device;

receiving, by the device, idle channel indications from two or more other devices of the plurality of devices;

advancing the common backoff procedure based upon the received idle channel indications;

once the common backoff procedure for the class is completed, sending, by the device, instructions to two or more of the plurality of devices which instruct those devices to perform one or more transmissions which may be transmitted simultaneously with other transmissions in the class which are transmitted by one or more other devices and independent of whether a backoff procedure initiated at the two or more of the plurality of devices indicates it is time to transmit in that class; and updating, by the device, the common backoff procedures for the class based on the one or more transmissions.

* * * * *